Patented Sept. 23, 1952

2,611,759

UNITED STATES PATENT OFFICE 2,611,759

PHENOLIC MOLDING COMPOUND

Charles Henry Hempel, Manitowoc, Wis., assignor to Heresite & Chemical Company, a corporation of Wisconsin No Drawing. Application January 26, 1950, Serial No. 140,769

6 Claims. (Cl. 260—57)

This invention relates to the manufacture of a phenolic molding compound, the methods of making the compound and the compound itself.

Molding powders made of phenolic resins, and particularly the phenol-formaldehyde resins, are well known. The present molding powder differs from those previously available in that it may be made transparent and clear—that is, free from gas bubbles.

The present material will produce a molded article which is transparent, amber in color or lighter, of great chemical resistance, high di-electric properties, great resistance to water absorption and of even greater strength than articles previously formed from phenolic resins containing fillers. The product can also be formed by ordinary heat and pressure methods.

The new molding compound and molded product have a wide variety of uses. For example, milking machine parts such as the shells for the inflations may be made transparent so that it may be ascertained readily whether or not the machine is operating properly and when the milk flow has ceased.

The product is produced by methods which differ in two substantial points from the prior art. In the first place, previous molding powders were produced by the use of catalysts, including free ammonia. This ammonia was present either as ammoninum hydroxide or hexamethylene-tetramin. The present product does not include any compound of ammonia which will liberate ammonia during the subsequent molding process. Instead of ammonium hydroxide, a catalyst is emsodium carbonate or ammonium carbonate is employed. Magnesium carbonate, potassium hydroxide and potassium carbonate may be substituted, but are less desirable. They act much more slowly.

The second fundamental difference between the present product and those of the prior art is that the molding powder is produced directly, rather than by formation of a sheet and subsequent disintegration of the sheet into a powder by grinding or crushing. In the present process the resin after formation is violently agitated under a limited temperature, during which time it passes from the liquid phase, through a syrupy phase, into a lumpy phase and finally into a dry powder. This procedure eliminates over-cured particles which otherwise would speckle the finished product.

The following is an example of the process:

100 parts by weight of phenol and 120 parts of 40% formaldehyde and a small proportion of a catalyst are mixed. Preferably from 5 to 10 parts of sodium carbonate are employed in the above mix. When using ammonium carbonate as the catalyst, the resin may be prepared from 100 parts phenol, 100 parts formaldehyde and 20 parts ammonium carbonate.

The ingredients are boiled under a reflux condensor until the resin precipitates, the boiling then being extended for an additional 30 minutes. Thereafter vacuum is applied and the water removed from the resin by heating. During this phase, the temperature is not allowed to pass materially above 90° C. While 90° C. is the preferred operating temperature, slightly higher temperatures may be employed with care, but in no event is it desired to go above 95° C. During the process a vacuum of 24 inches is preferred and when the temperature of the material reaches 90° C. under such a vacuum, the resin becomes clear. It is then transferred to an agitator which is preferably in the form of a conventional kneader equipped with two agitators revolving toward each other. The kneader, of course, is equipped with a steam jacket and a hood, the latter communicating with a suitable vacuum pump. A high vacuum is again imposed and the resin brought to the boiling point, but below the limiting temperature. Great care is used to see that the temperature is uniform, otherwise local overheating may occur. The maintenance of boiling conditions throughout the mass, however, is of great assistance in making the temperature uniform.

Samples are taken periodically to determine when the resin has reached the proper stage. When the resin has reached the middle of the B stage, the operation is stopped. During this operation in the kneader, the liquid resin becomes a syrup, then forms large lumps and finally becomes a free flowing powder. If the operation is stopped too soon, the resin will not harden under heat and pressure and is also too brittle. If cooked too long, the powder will not flow under heat and pressure. An experienced operator may readily determine from the appearance of the powder when the proper condition has been reached, and an inexperienced operator may determine the proper stage by taking appropriate samples and testing them.

As soon as the proper stage has been reached, the contents of the kneader are emptied into large pans so that the powder may be spread over a large area and cooled rapidly.

The powder is then molded in the usual manner, although it requires a slightly longer curing time than normal powders. A milking machine inflation shell 1/16th inch in thickness requires a curing time of approximately ten minutes.

This application is a continuation of my copending application No. 658,227, filed March 29, 1946 and now abandoned.

The foregoing detailed description has been given for clearness of understanding only, and no unnecessary limitations should be understood therefrom as modifications will be obvious to those skilled in the art.

I claim:

1. The method of forming a heat setting formaldehyde base molding composition which comprises forming phenol formaldehyde resin by reacting the resin-forming ingredients in aqueous solution, and violently agitating the resin under vacuum at a temperature not substantially above 95° C., during which agitation the product passes through a syrupy phase and into a soft lumpy phase, and then stopping the agitation and cooling the resin when it forms into a dry molding powder.

2. The method as set forth in claim 1 in which the temperature does not exceed 90° C.

3. The method which comprises forming a phenol formaldehyde resin by reaction of phenol and formaldehyde in aqueous solution, boiling the ingredients under reflux conditions until the resin precipitates, applying a vacuum to remove water but limiting the temperature to 95° C., or less, whereby the resin redissolves to form a clear solution, agitating the clear solution under vacuum and below 95° C., the vacuum being sufficiently high to cause boiling throughout the mass until the resin reaches approximately the B stage, during which agitation the product changes from a solution to a syrup, into large lumps and finally into a free flowing powder.

4. The method of forming a phenol formaldehyde molding composition which comprises mixing 100 parts by weight of phenol with 100 to 120 parts by weight of a 40% solution of formaldehyde in an aqueous solution with an alkaline catalyst of the class consisting of sodium, ammonium, magnesium and potassium carbonates and potassium hydroxide, and then cooking the mixture under violent agitation and at a temperature not exceeding 95° C. while applying a vacuum during at least a portion of the agitation, until a dry molding powder forms.

5. The method of forming a phenol formaldehyde composition which comprises mixing 100 parts by weight of phenol with 100 to 120 parts by weight of a 40% solution of formaldehyde in an aqueous solution with an alkaline catalyst of the class consisting of sodium, ammonium, magnesium and potassium carbonates and potassium hydroxide, boiling the mixture until the resin precipitates, removing the water from the mixture by vacuum while maintaining the temperature of the mixture below 95° C. and under a high vacuum until the resin becomes clear, and then agitating the resin under vacuum at an elevated temperature below 95° C. until the resin forms a dry molding powder.

6. The method of forming a phenol formaldehyde composition which comprises forming a mixture consisting of 100 parts by weight of phenol, 100 parts by weight of a 40% aqueous solution of formaldehyde, 20 parts by weight of ammonium carbonate in an aqueous solution, cooking the mixture under violent agitation at a temperature not exceeding 95° C. and during the major portion of said agitation subjecting the mixture to a vacuum of 24 inches of mercury, said cooking and agitation being continued until the mixture becomes a dry molding powder.

CHARLES HENRY HEMPEL.

REFERENCES CITED

The following references are of record in the file of this patent:

UNITED STATES PATENTS

| Number | Name | Date |
|---|---|---|
| 357,481 | Hancock | Feb. 8, 1887 |
| 954,666 | Baekeland | Apr. 12, 1910 |
| 1,927,375 | Schmidt | Sept. 19, 1933 |
| 1,981,514 | Koebner | Nov. 20, 1934 |
| 2,137,568 | Cserny | Nov. 22, 1938 |
| 2,253,235 | Hempel | Aug. 19, 1941 |
| 2,473,145 | Hesselbart | June 14, 1949 |

OTHER REFERENCES

Morrell, R. S. Synthetic Resins and Plastics, 1943, page 111.

Laughlin, H. G., Trans. American, Inst. Chem. Engrs. 36, 1940, pages 345–355.